United States Patent [19]
Vallat

[11] Patent Number: 5,969,329
[45] Date of Patent: Oct. 19, 1999

[54] READING FRAME FOR A MICROCIRCUIT CARD READER APPARATUS

[75] Inventor: Bernard Vallat, Lattes, France

[73] Assignee: Framatome Connectors International, Cedex, France

[21] Appl. No.: 08/913,336

[22] PCT Filed: Mar. 21, 1996

[86] PCT No.: PCT/FR96/00427

§ 371 Date: Dec. 15, 1997

§ 102(e) Date: Dec. 15, 1997

[87] PCT Pub. No.: WO96/29671

PCT Pub. Date: Sep. 26, 1996

[30] Foreign Application Priority Data

Mar. 22, 1995 [FR] France ................................. 95 03347

[51] Int. Cl.⁶ ..................................................... G06K 07/06
[52] U.S. Cl. ........................................... 235/475; 235/441
[58] Field of Search .................................... 235/375, 380, 235/492, 475, 479, 486, 487, 445

[56] References Cited

U.S. PATENT DOCUMENTS

| | | | |
|---|---|---|---|
| 5,257,414 | 10/1993 | Trahan et al. | 455/90 |
| 5,336,877 | 8/1994 | Raab et al. | 235/475 |
| 5,395,259 | 3/1995 | Casses | 439/188 |
| 5,402,095 | 3/1995 | Janniere | 235/441 |
| 5,463,210 | 10/1995 | Imura | 235/441 |
| 5,530,235 | 6/1996 | Stefik et al. | 235/492 |
| 5,564,933 | 10/1996 | Bouchan et al. | 439/76.1 |
| 5,581,249 | 12/1996 | Yoshida | 340/928 |

FOREIGN PATENT DOCUMENTS

| | | | |
|---|---|---|---|
| 0 363 871 A2 | 10/1989 | European Pat. Off. | G11C 5/00 |
| 0 595 305 A1 | 10/1993 | European Pat. Off. | G06K 7/01 |

*Primary Examiner*—Thien Minh Le
*Attorney, Agent, or Firm*—Pollock, Vande Sande & Amernick

[57] ABSTRACT

A reading frame for an apparatus for reading smart cards, comprising a body supporting brush contact elements for electrically contacting the conductive pads of a chip on a card inserted in the frame. The frame comprises an electric circuit connected to at least some of the brush contact elements and connectable to the electronic circuit of the card reader. The electronic circuit on the connector comprises an arrangement for controlling the insertion of the card in the card reader and its withdrawal therefrom, and the reading frame comprises an additional brush contact or cut-off sensing which is offset in relation to the primary brush contacts in the direction in which the card is inserted, and electrically contacts one of the conductive pads of the smart card whether or not the card has a primary contact.

6 Claims, 6 Drawing Sheets

FIG_4

FIG_5a

FIG_5b

FIG_8

FIG_9

READING FRAME FOR A MICROCIRCUIT CARD READER APPARATUS

FIELD OF THE INVENTION

The invention concerns a reading frame for a microcircuit card reader apparatus.

In the context of the invention, "card" means all types of card of the kind incorporating a hybrid or monolithic integrated circuit or "microchip". The term "microcircuit" will be used hereinafter. The card is, for example, a card in the "credit card" format, known also as a "memory card". The microcircuit is usually based on a microprocessor or a microcontroller including memory circuits, for example of the "PROM" type. It must be possible to insert this type of card into dedicated devices for reading and/or writing data. For the sake of simplicity, this device will be referred to as a "reader" hereinafter, it being understood that it can equally write data and perform other ancillary functions (electrical power supply, tests) referred to hereinafter. The data is stored in the aforementioned memory circuits, usually in encrypted form. It is therefore read from memory locations or written to memory locations.

Other logical architectures are used in particular for "electronic purse" or similar type applications.

In all cases there are input-output members in the form of contact areas, also known as "pads", flush with the surface of one of the principal faces of the card. Various standards (ISO, AFNOR, etc) define the position of these contact areas. They are used not only for the aforementioned data inputs-outputs but also to supply electrical power to the microcircuit and to enable various checks to be carried out, according to the applications concerned (presence test, etc). The reader includes a reading frame fitted with brush contacts that make galvanic contact with the aforementioned areas when the card is inserted correctly into the reading frame.

BACKGROUND OF THE INVENTION

Various needs and trends are currently emerging, including, the need to make the operation of card reading apparatus more secure. To achieve this, it is necessary:

1) to assure that the card is inserted correctly before the microcircuit is powered up and the dialog sequence with the latter is begun.

2) to assure rapid disconnection of the power supply from the card in the event of a misoperation "pulling out" of the card, to limit the risk of damage to the circuits and/or fraud attempts.

To this end, current reading systems include a device for detecting correct insertion of the card which uses an end-of-travel contact whose closure conditions, the start of electronic initialization read-write sequences controlled by the electronics of the reader and monitored by a microprocessor to conform to a particular chronology for which the reader:

powers up the microcircuit, activates the data input-output channels, activates the microcircuit clock channel, and performs a microcircuit initialization sequence.

The microcircuit must then respond to the initialization sequence in a particular way in order to enable dialog between the microcircuit of the card and the microprocessor of the reader. At the end of this dialog the microprocessor performs a card deactivation sequence.

Microcontroller-based dedicated circuits are available which manage these sequences of initializing and ending dialog with the microcircuit and which additionally monitor overvoltages and short-circuits on the card.

Nevertheless, if the card is pulled out, the powering down and deactivation of the various channels entails:

1) opening of the card presence contact, 2) detection by microprocessor or the dedicated microcontroller of this opening before powering down of the card can be initialized by a sequence of logical operations.

The card can be pulled out at speeds up to 1 m per second. This requires a card presence contact having a travel of less than 0.1 mm to guarantee a reaction time less than 100 $\mu s$ compatible with execution of the card emergency deactivation sequence.

A first problem is that there is often a lack of precision as to the position of the end of travel contacts, especially if these are horizontal or mounted on a frame independent of the reading frame.

A second problem is that the reaction time of the microprocessor or the microcontroller depends on its internal program and on the clock frequency sequencing it.

The applicant has found that:

insertion of the card is assumed to be correct on activation of the end of travel contact;

the initialization sequence begins by the application of voltage to the card power supply brushes;

before powering up and during the initialization phase of the card the initialization (reset channel) brush is at logic 0 potential;

during the initialization sequence the signal brushes are in a so-called "high impedance" state.

SUMMARY OF THE INVENTION

Based on these findings, it is an object of the invention is to provide a device for detecting incorrect positioning of the contact areas of the card relative to the brushes applicable to fast detection of loss of contact between the brushes and contact areas of the cards.

To this end, in accordance with one important feature of the invention, an additional brush contact is provided on the card reading frame, called the disconnect contact and set back slightly relative to the axis common to the brush contact members of the same row.

In accordance with a second aspect of the invention, this contact is associated with a logical circuit for fast detection of disconnection and deactivation of the card, this logic circuit executing some or all of the following functions:

setting the initialization channel of the microcircuit of the card to 0, setting the signal channels of the card to the high impedance state, cutting off the power supply from the card.

The invention therefore consists of a reading frame for apparatus for reading microcircuit cards, including a body supporting brush contact members adapted to be brought into electrical contact with conductive areas associated with the microcircuit when the card is inserted into the frame, and it includes an electronic circuit connected to at least some of the brush contact members and adapted to be connected to the electronic circuit of the card reader. The electronic circuit carried by the connector includes means for controlling insertion of the card into the card reader and withdrawal of the card from the card reader, and the reading frame includes an additional disconnection detection brush contact offset relative to the primary brush contacts in a direction of insertion of the card and adapted to be brought into electrical contact with one of the conductive areas of the microcircuit card, whether or not the latter receives a primary contact.

The reading frame in accordance with the invention therefore includes, in combination, an electronic circuit as described in PCT patent application FR 96/00156 filed Jan. 30, 1996 and an additional brush contact as described in EP-A-0 595 305.

In one advantageous embodiment, the reading frame includes primary brush contacts providing signal brush contacts, and a ground brush contact, a power supply brush contact.

In a preferred embodiment, the disconnection detector contact can be in electrical contact with the power supply brush contact via a power supply conductive area.

BRIEF DESCRIPTION OF THE DRAWINGS

The invention will be better understood and other features and advantages will appear from a reading of the following description with reference to the accompanying drawings, in which.

DESCRIPTION OF THE PREFERRED EMBODIMENT

Figure 1:
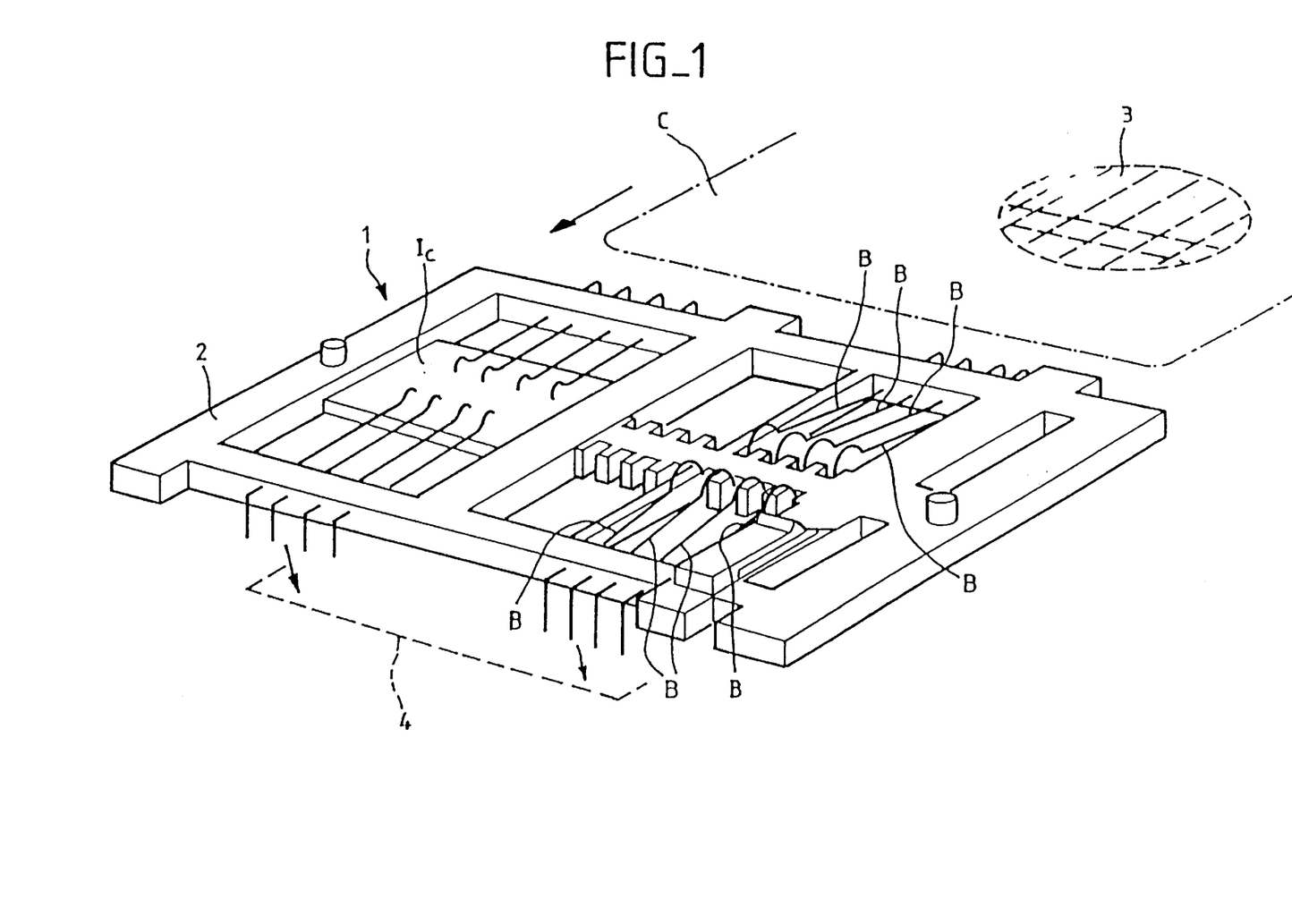
FIG. 1 is a perspective view of a reading frame in accordance with the invention.

In the FIG. 1 embodiment, the connector 1 for apparatus for reading a card C incorporating a microcircuit 3 has a body 2 supporting brush contact members B designed to come into electrical contact with conductive areas associated with microcircuit 3C when the card C is inserted in the connector 1.

In accordance with the invention, the connector 1 includes an electronic circuit $I_C$ connected to at least some of brush contact members $C_1$ through $C_8$ and to the electronic circuit 4 of the card reader. The electronic circuit $I_C$ carried by the connector 1 includes means described in detail in PCT Application FR 96/00156 for monitoring inserting the card C into the card reader and removing it therefrom.

Figure 2:
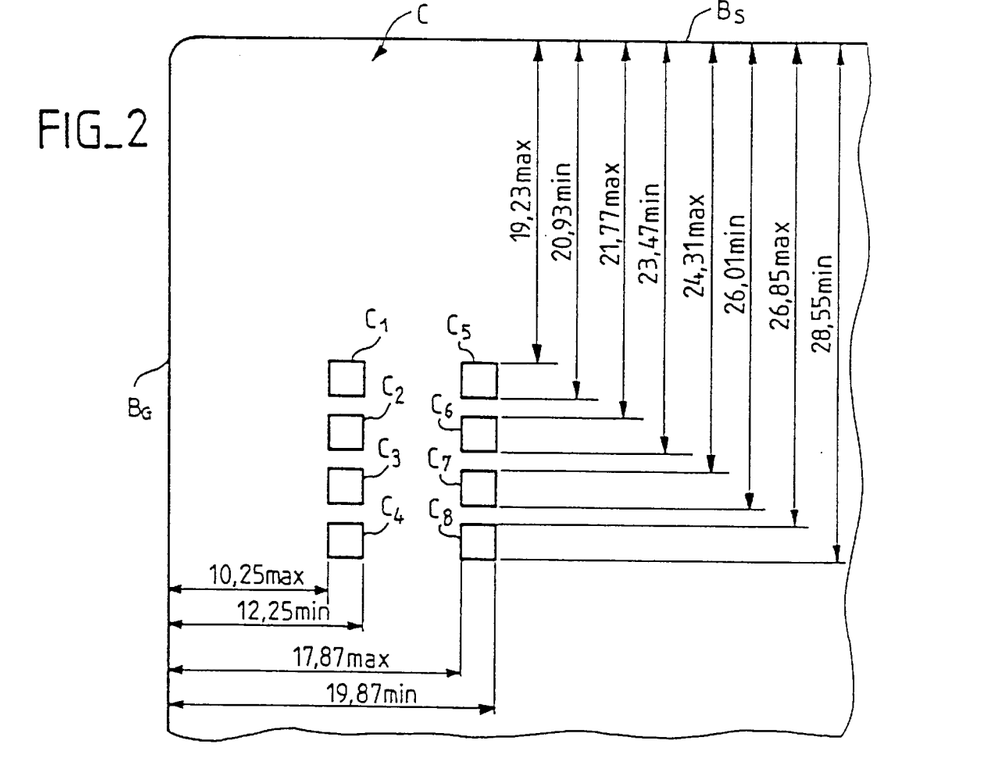
FIG. 2 shows a first example of a microcircuit card conforming to the ISO standard, showing the location of the contacts and their principal geometrical characteristics.

FIG. 2 shows a fragment of a card C conforming to the ISO 7816 standard. This standard specifies the dimensions, the location and the assignment of the contact areas $C_1$ through $C_8$ flush with the surface of ID-1 type microcircuit cards. The card may include one or more microcircuits. The input-output terminals of these microcircuits are connected to these contact areas $C_1$ through $C_8$.

The contact areas $C_1$ through $C_8$ are organized in two rows each of four areas, $C_1$ through $C_4$ and $C_5$ through $C_8$, respectively, substantially parallel to each other and to the lefthand edge $B_G$ (in the figure) of the card C, this edge serving as an abutment. FIG. 2 also shows the top edge $B_S$ of the card C and indicates the principal geometrical characteristics defining the contacts $C_1$ through $C_8$ expressed as minimal and maximal distances (in millimeters) as stated in the aforementioned standard.

There are eight contacts, as previously indicated. They can be on the front or on the back of the card C, but the aforementioned distances are defined relative to the lefthand edge $B_G$ and the top edge $B_S$ of the card C.

The assignment of the contacts is set out in the table appended to the present description.

Figure 3:
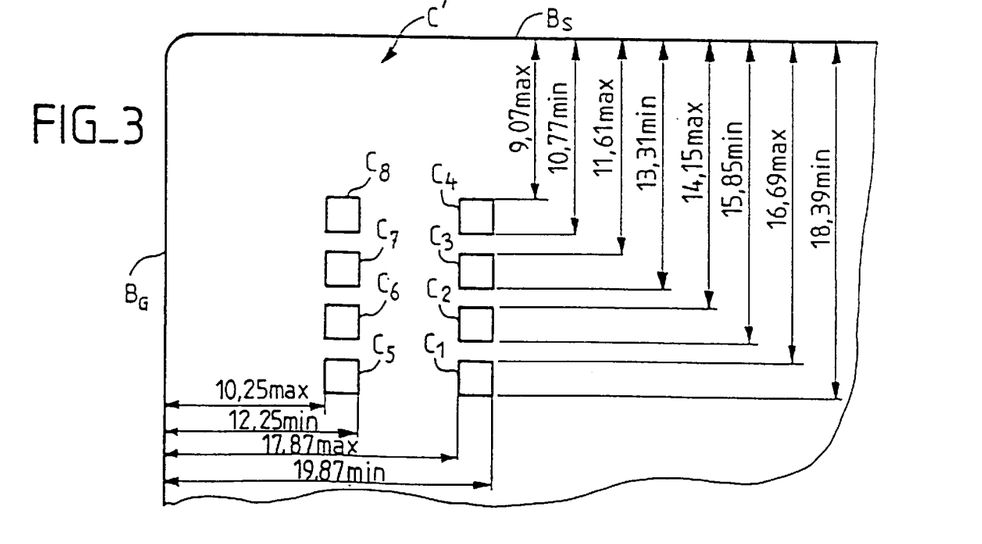
FIG. 3 shows a first example of a microcircuit card conforming to the AFNOR standard, showing the location of the contacts and their principal geometrical characteristics.
Figure 4:
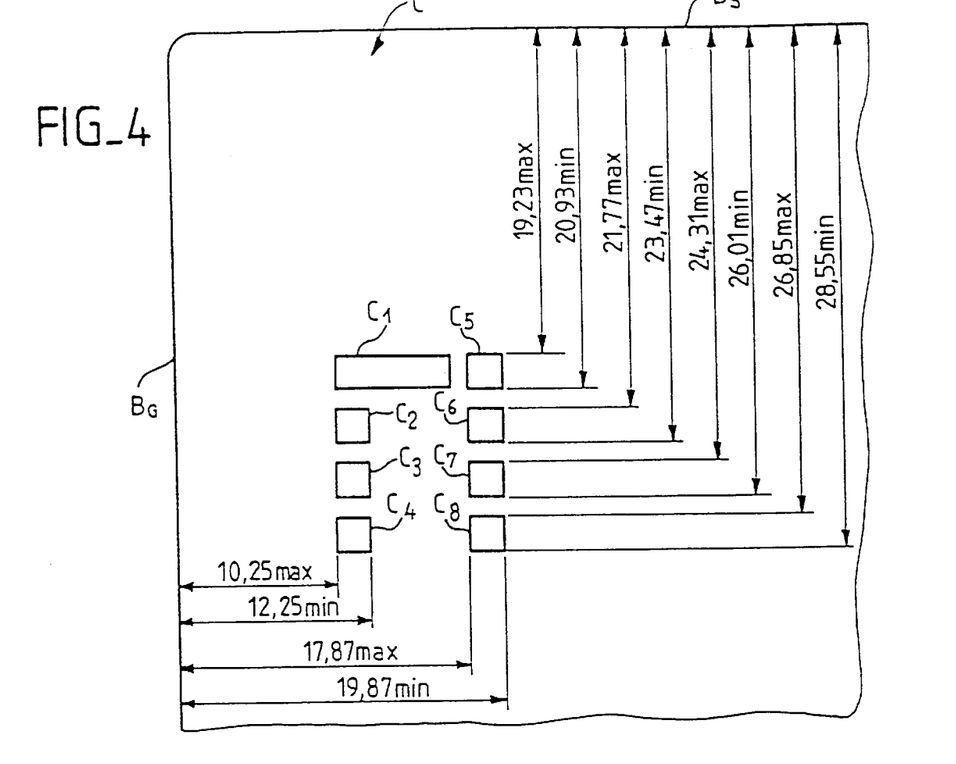
FIG. 4 shows a first example of a microcircuit card conforming to the ISO standard, with a special configuration of the contacts.

FIG. 3 shows one example of a microcircuit card C conforming to the older AFNOR standard using the same representation conventions as the card C.

There are significant differences concerning the distances between the contact areas $C_1$ through $C_8$ and the previously mentioned lefthand and top edges. The location of the contact areas is also different. For example, the contact $C_8$ on the ISO card is in the same place as the contact $C_1$ on the AFNOR card.

The connector used in the card reader must allow for the standard employed, this constraint being common to the prior art connectors.

Figure 5A:
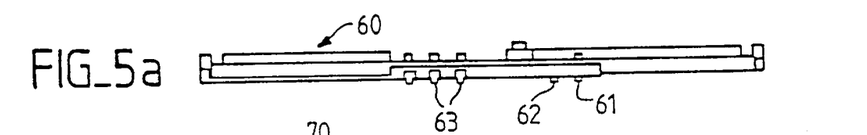
FIGS. 5a and 5b show one example of a prior art connector for a microcircuit card reader.
Figure 5B:
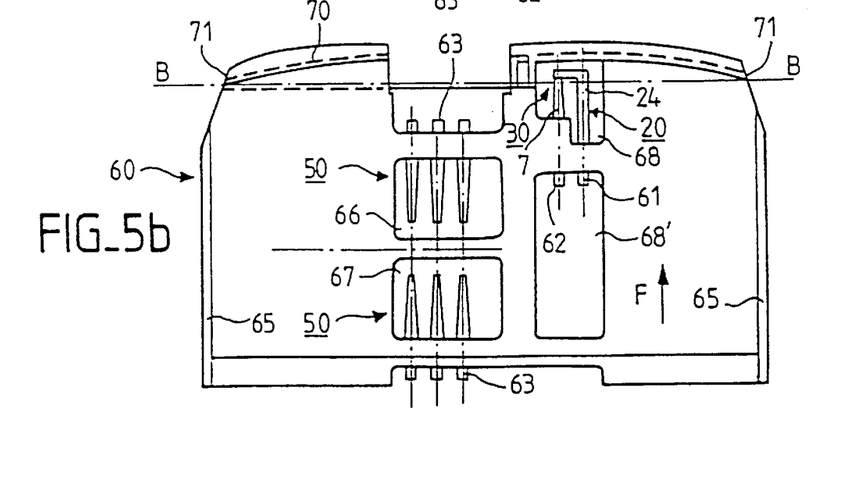

FIGS. 5a and 5b show, by way of example, a prior art connector 60 seen in section taken along the line B—B and from above, respectively. The brush contact members 50 bent at 63 are disposed in two rows in respective openings 66 and 67. The connector also includes a pair of "end of travel" detector contact members 20 and 30, bent at 61 and 62. The members 20 and 30 are disposed in an opening 68 and their bent ends in an opening 68'.

To facilitate insertion of a card (not shown) in the direction of arrow F, the front edge 70 (at the top in FIG. 5b), which is curved, has two lateral end points 71. These two points 71 define an abutment line B—B for the card. The region 24 of the contact member 20 near the abutment line B—B has a crook-shaped profile. When the card is inserted completely into the connector 60, it pushes back the contact member 20. This brings the two contact members 20 and 30 into contact and complete insertion of the card ("end of travel") is detected by appropriate electronic circuits of the reader (not shown) associated with the connector 60.

This detection authorizes application of the power supply voltage to the brush associated with area $C_1$ of the card C (see FIG. 2, for example).

In accordance with the invention, a supplementary "disconnection detection brush" type contact member is added in parallel with the standard "voltage brush", in a configuration described below. This supplementary brush is offset relative to the standard brush.

Figure 6:
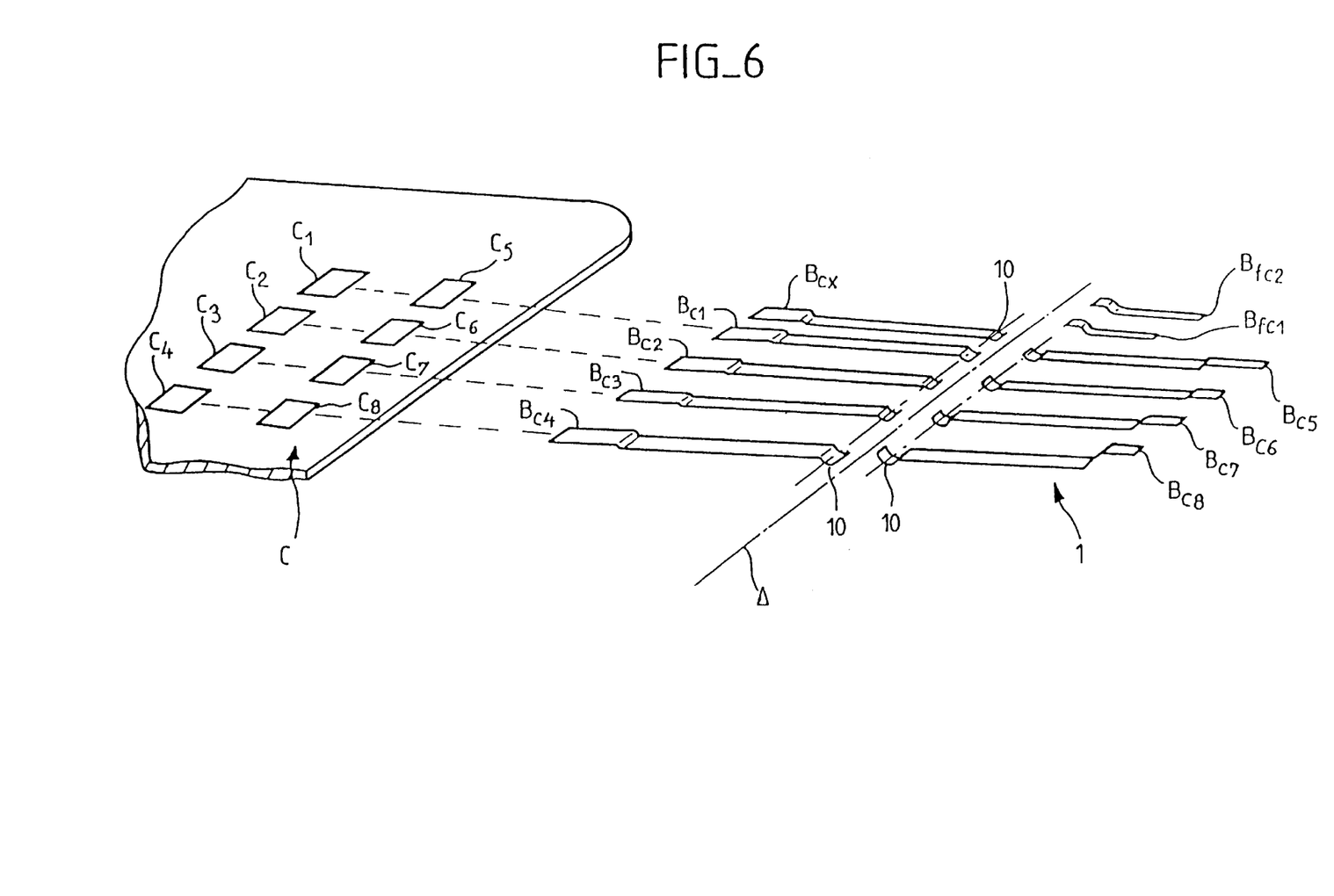
FIG. 6 shows the arrangement of the contact members in one example of a connector constituting a first embodiment of the invention.

FIG. 6 is a schematic showing a connector 1 for insertion of a card C of the invention. It is assumed, in the example shown in this FIG. 6, that the card $C_{ard}$ to be inserted into the connector 1 conforms to the aforementioned ISO standard.

For the sake of clarity, FIG. 6 shows only the contact members and their spatial arrangement. The other components, including the connector body and other accessories, can be conventional, for example those of the connector shown in FIGS. 5a and 5b.

In a manner known per se, the connector 1 has two rows each of four brush contact members $B_{C1}$–$B_{C4}$ and $B_{C5}$–$B_{C8}$, respectively. Each of these brushes is adapted to make galvanic contact with a corresponding area $C_1$ through $C_8$ of the card C. They provide the contact members 50 from FIG. 5a.

In a manner also known per se, a pair of "end-of-travel" contact members $B_{fc1}$ and $B_{fc2}$ may also be provided to detect complete and correct insertion of the card C into the connector 1.

FIG. 6 shows that the brushes $B_{C1}$–$B_{C4}$ and $B_{C5}$–$B_{C8}$ are in the form of thin, flexible, metal blades the distal ends 10 of which are crook-shaped. These blades are parallel to each other and the aforementioned distal ends face each other in pairs on opposite sides of an axis of symmetry A perpendicular to the blades.

In accordance with one essential feature of the invention, an additional contact member $B_{CX}$ duplicates the "disconnection detection brush" type contact member $B_{C1}$. This additional contact member $B_{CX}$ may be cut out from the same strip as the standard contacts and simultaneously molded into the connector body, during manufacture of the connector (see FIG. 5b). In this case it is advantageous to reduce the width of one blade and to add a fifth blade alongside it.

In all cases, this additional contact member $B_{CX}$ detects withdrawal of the card C and activates or deactivates the microcircuit card accordingly, as explained hereinbelow.

Figure 7A:
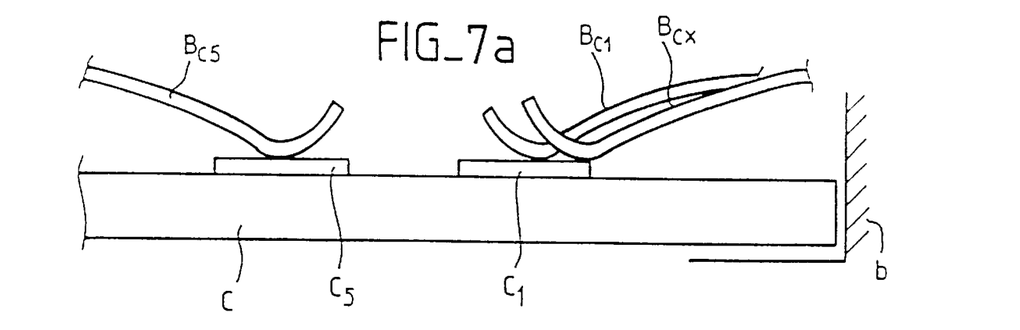
FIGS. 7a and 7b are detail views illustrating the operation of a connector of the invention adapted to receive cards in accordance with the ISO standard.

Still in the case of a card C conforming to the ISO standard, FIG. 7a shows the position of the brush contact members $B_{C1}$ and $B_{CX}$ relative to the area $C_1$ in the normal working position, i.e., with the card C correctly inserted into the connector 1. In this case the brush contact member $B_{CX}$ is set back (relative to the center of the card) from the brush contact member $B_{C1}$ but on the area $C_1$. The card C is immobilized against an abutment b.

In this normal working condition, the brush contact member $B_{C1}$ is live at the power supply voltage $V_{CC}$, which is generally +5 V. The area $C_1$ is then at the same potential. The additional contact $B_{CX}$ "reads" the card power supply voltage VCC and disables the disconnection logic which starts the card initialization and read sequences and enables the electrical power supply to the microcircuit of the card. Read and/or write operations can proceed normally.

Figure 7B:
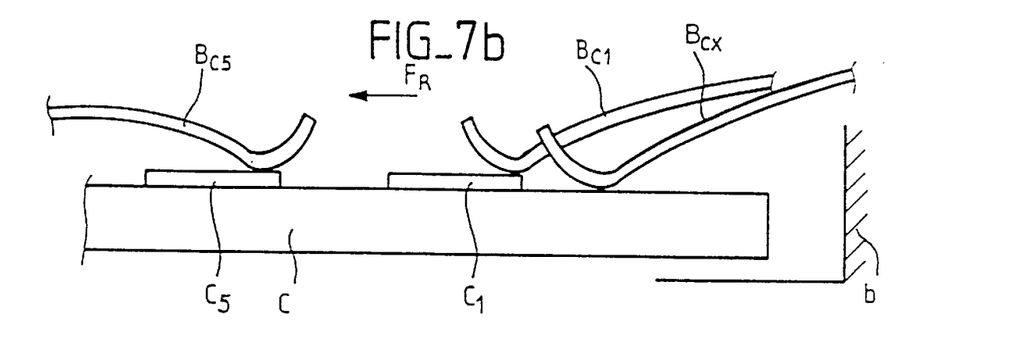

If the card is withdrawn, either normally or "pulled out", the area $C_1$ is moved in translation in the direction of the arrow $F_R$ and the brush contact member $B_{CX}$ is the first to leave the latter. This situation is shown in FIG. 7b.

The voltage "read" by this additional brush contact member $B_{CX}$ disappears through a high level/low level transition which activates the emergency disconnection logic electronic circuit.

However, the other contact members $B_{C2}$ through $B_{C8}$ do not have time to leave their respective areas $C_2$ through $C_8$.

Figure 8:
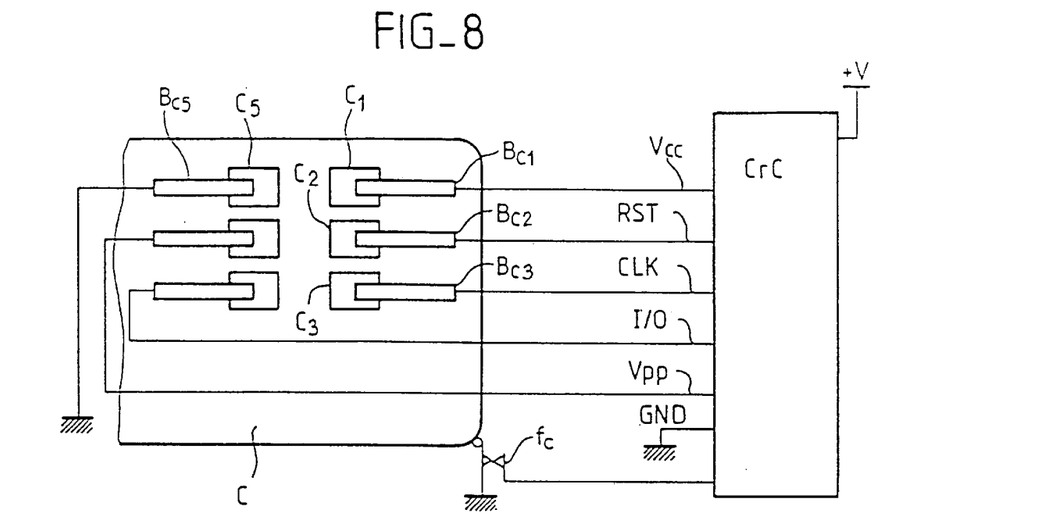
FIG. 8 shows the electronics specific to the card reader, associated with the connector of the invention.

FIG. 8 is a block schematic of a device for reading cards to the ISO format with six contacts (prior art). In this device, an end-of-travel contact $f_c$ is connected to the control circuit CrC of the card reader. As soon as closure of this contact is detected, the control circuit establishes the power supply voltage $V_{CC}$ of the card via the brush contact $B_{C1}$ and starts the sequence initializing dialog procedures between the reader and the card, in particular by deactivating the reset input RST of the card, by establishing the clock CK of the card and by activating the input/output lines I/O used for dialog between the card and the reader, via the respective corresponding brush contacts of the card.

Figure 9:
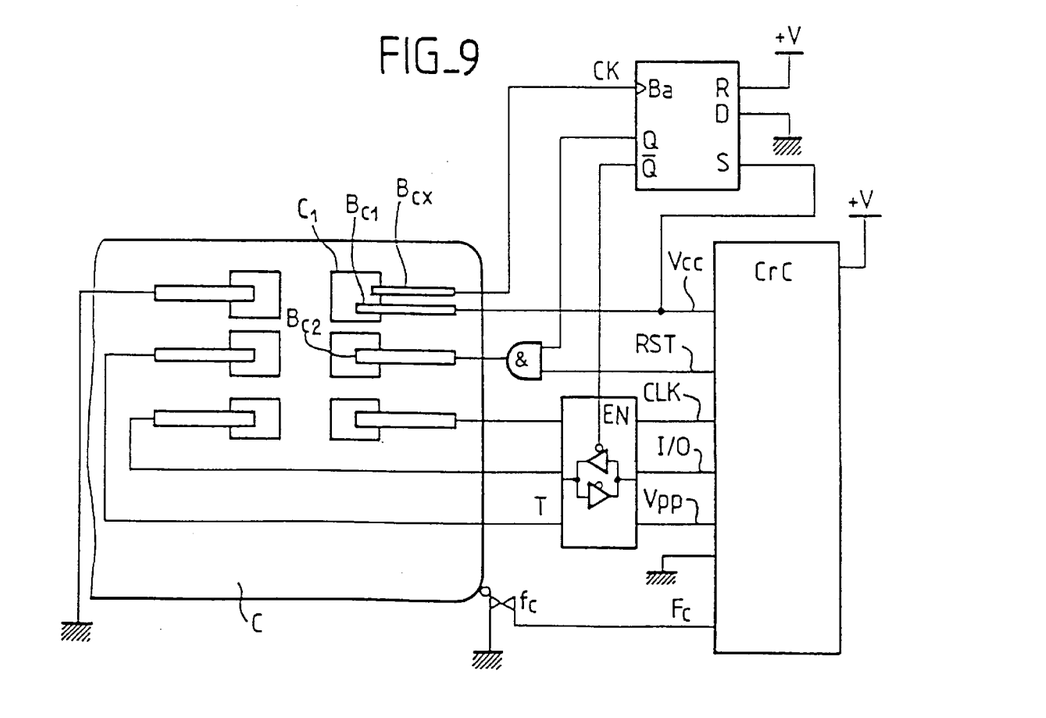
FIG. 9 shows one embodiment of an emergency disconnection logic electronic circuit of the invention.
Figure 10A:
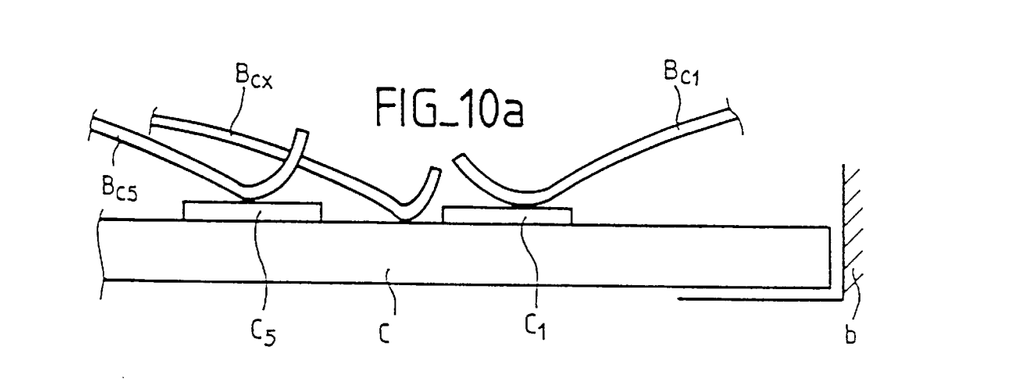
FIGS. 10a and 10b show a different embodiment of the connector of the invention.
Figure 10B:
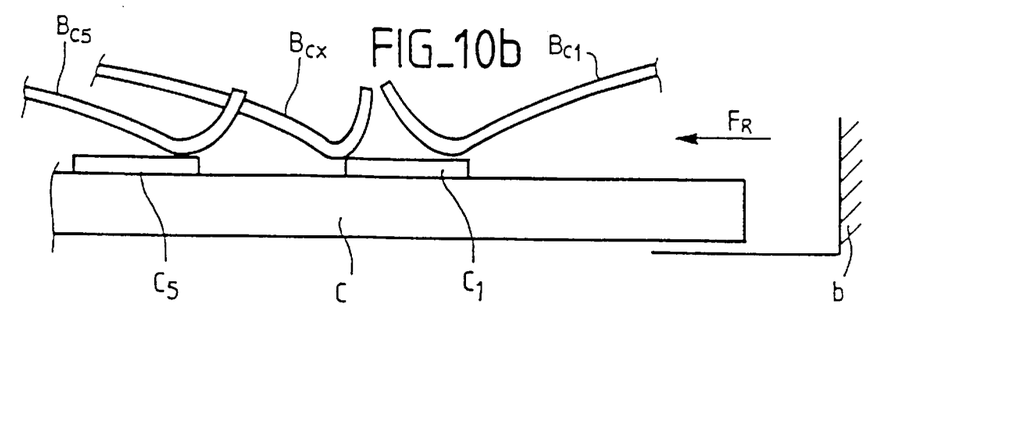

FIG. 9 shows a simplified emergency disconnection logic electronic circuit using the additional contact $B_{CX}$ to stop the dialog between the card reader and the card instantaneously. To this end, the signal from pin $V_{CC}$ of the control circuit is connected to the SET input "S" of a flip-flop Ba. The clock input CK of the flip-flop Ba, activated on a high level/low level transition, is connected to the contact $B_{CX}$. The D input of the flip-flop Ba is at the logic 0 level. The inverting output $\overline{Q}$ is connected to the enable input EN of a buffer circuit through which the clock, input/output and programming Vpp channels of the card pass in this example. The inverting output $\overline{Q}$ of the flip-flop Ba, combined with the RST output of the control circuit via an AND gate, is connected to the initialization (reset) brush of the card and in contact with the area $B_{C2}$.

This device operates as follows:

On insertion of the card, the end of travel contact $f_c$ closes and, as in prior art devices, detection of this closure by the control circuit CrC of the card reader enables the power supply $V_{CC}$ of the card. In accordance with the invention, this closure then sets the emergency disconnection device by setting the flip-flop Ba to a state waiting for a downgoing transition of the signal from the additional contact $B_{CX}$.

On detecting closure of the end of travel contact $f_c$, the control circuit powers up the card. This causes a logic "1" level to appear at the SET input "S" of the flip-flop Ba. The flip-flop Ba then goes from a state in which its inverting output $\overline{Q}$ is at a logic "1" level, independent of the state at its clock input CK, to a state waiting for a falling edge of the clock signal CK.

The disconnection device is therefore set, but it remains transparent to the signals RST, CLK and I/O because the "Q" and "$\overline{Q}$" outputs of the flip-flop Ba remain in a state authorizing the passage of these signals through the AND gate, in the case of a signal RST, and through the buffer circuit T, in the case of the signals CLK and I/O.

If the card is pulled out, the brush $B_{CX}$ leaves the area $C_1$ and no longer reads the voltage $V_{CC}$. This causes a high level/low level transition at the flip-flop Ba so that the output Q goes to the value "0", read at its D input, triggering the following events:

the output of the AND gate goes to "0", triggering a "RESET" of the microcircuit card $C_{ard}$, the brushes of the reader carrying the signal CLK and I/O are deactivated by disabling the buffer circuit T.

This emergency disconnection logic device therefore protects the input/output channels of the card until the control circuit detects a fault, cutting off of the power supply voltage $V_{CC}$ and normal deactivation of the microcircuit card.

The simplified device described here can be enhanced, in particular by the provision of devices protecting against overvoltages, anti-bounce devices and the like, evident to those skilled in the art, and can in particular include an additional flip-flop for cutting off the voltage $V_{CC}$ or an additional error detection line connected to the control circuit CrC.

It is also possible, without departing from the scope of the invention, to place the additional brush contact in front of the area $V_{CC}$ (relative to the center of the card), but also outside the area $V_{CC}$. Pulling out of the card then brings the power supply brush contact $B_{C1}$ into contact with the additional brush contact $B_{CX}$ via the area $C_1$, which generates a rising edge which merely has to be inverted to achieve identical operation of the detector device.

For the invention to be effective, certain requirements must be met. These are essentially concerned with conformance to manufacturing tolerances and tolerances in respect of the position in the connector of the contact member $B_{C1}$ relative to the areas $C_1$ when the card is in the abutted position and the offset between the standard contact member $B_{C1}$ and the additional contact member $B_{CX}$.

To provide a more concrete example the center of the area $C_1$ is at a distance of 18.87 mm from the card abutment b, with maximum tolerance of +0.4 mm maximum and −0.5 mm. As has been indicated, the width of the area $C_1$ in a direction parallel to $F_R$ is 2 mm minimum and the distance between $C_1$ and an area contiguous with $C_1$ is 0.2 mm.

Where accuracy is concerned, in the case of a prior art connector provided with "end-of-travel" type contact members, guaranteeing a proper sequence is dependent on:

the mechanical precision of the aforementioned contact members;

the position of the contact areas relative to the edge of the card; and the position of the brush contact members relative to the "end-of-travel" type contact members.

In the case of a connector in accordance with the invention, the accuracy depends exclusively on:

the required offset of the brush contact members, obtained by a tool for cutting and bending the brushes; and the accuracy of the width of the contact areas.

The overall accuracy obtained is better than that obtained with the aid of "end-of-travel" type contact members alone.

APPENDIX

| Contact | Name and function |
| --- | --- |
| $C_1$ | VCC (Power supply voltage) |
| $C_2$ | RST (Reset signal) |
| $C_3$ | CLK (Clock signal) |
| $C_4$ | Reserved for future use |
| $C_5$ | GND (Ground) |
| $C_6$ | VPP (Programming voltage) |
| $C_7$ | I/O (Input/Output data) |
| $C_8$ | Reserved for future use |

I claim:

1. A reading frame for apparatus for reading microcircuit cards, including a body supporting brush contact members adapted to be brought into electrical contact with conductive areas associated with said microcircuit when the card is inserted into the frame, wherein said reading frame includes an electronic circuit connected to at least some of said brush contact members and adapted to be connected to the electronic circuit of the card reader, the electronic circuit carried by the connector including means for controlling insertion of the card into the card reader and withdrawal of the card from the card reader, and the reading frame further includes an additional disconnection detection brush contact offset relative to the primary brush contacts in a direction of insertion of the card and adapted to be brought into electrical contact with one of the conductive areas the microcircuit card whether or not the microcircuit card receives a primary contact.

2. The reading frame according to claim 1, wherein the primary brush contacts, a ground brush contact and a power supply brush contact, are adapted to be in contact with signal conductive areas, a ground conductive area and a power conductive area of the microcircuit card respectively.

3. The reading frame according to claim 1, wherein said disconnection detection contact is adapted to be in electrical contact with one of the primary brush contacts through the conductive area of the microcircuit card corresponding to this primary brush contact.

4. The reading frame according to claim 3, wherein said disconnection detection contact is adapted to be in electrical contact with the power supply brush contact through said power supply conductive area of the microcircuit card when the microcircuit card is abutted against an abutment in the reading frame.

5. The reading frame according to claim 3, wherein said disconnection detection contact is adapted to be in electrical contact with the power supply brush contact via said power supply conductive area of the microcircuit card when the microcircuit card is not abutted against an abutment in the reading frame.

6. The reading frame according to claim 1, wherein said disconnection detection contact constitutes a triggering signal connected to an emergency disconnection electronic device.

\* \* \* \* \*